May 15, 1956  P. F. BILLENSTEIN  2,745,564
SHOVEL LOADER ATTACHMENT FOR TRACTORS
Filed April 1, 1955  3 Sheets-Sheet 2
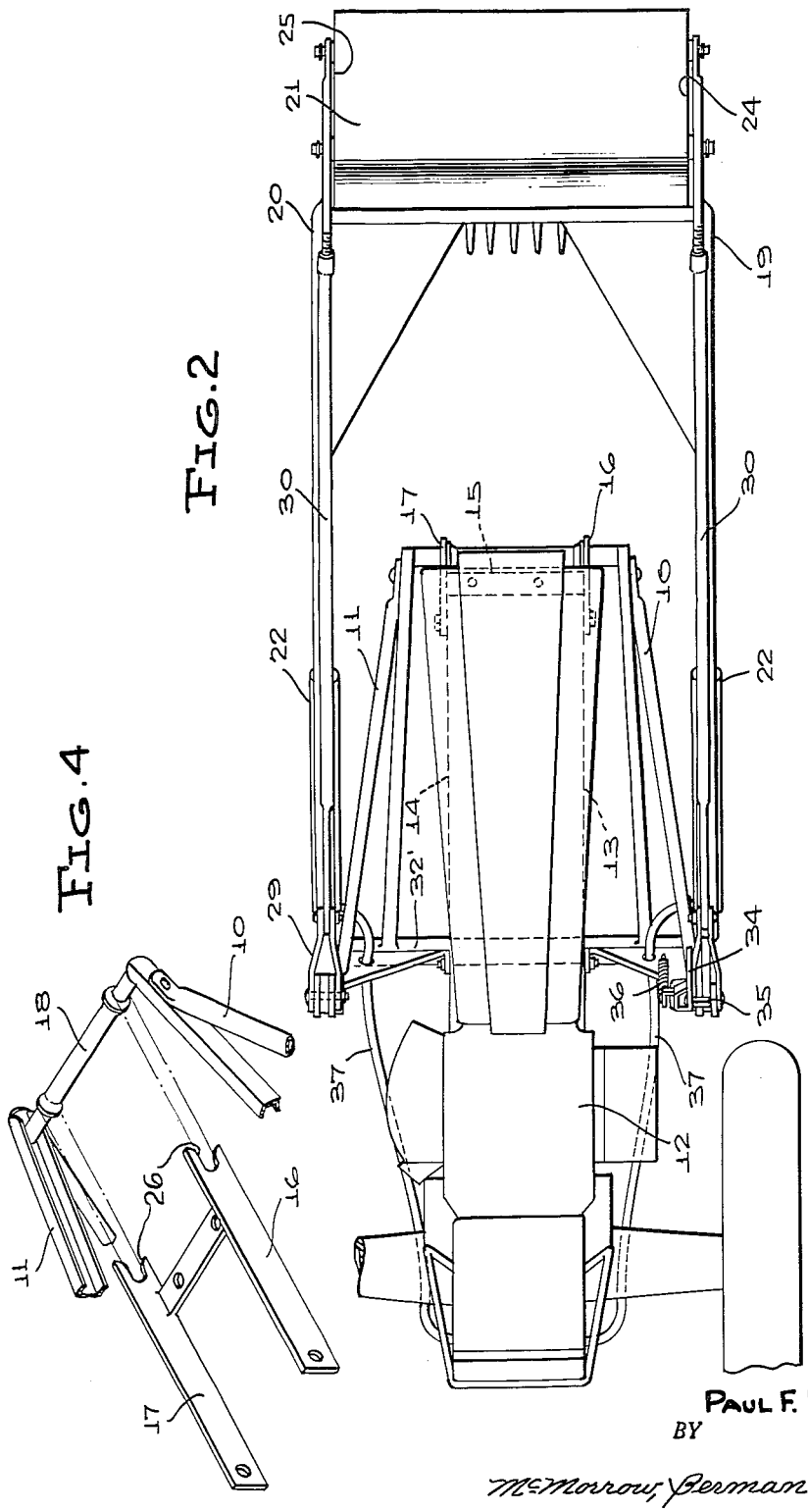
INVENTOR.
PAUL F. BILLENSTEIN
BY
McMorrow, Berman + Davidson
ATTORNEYS

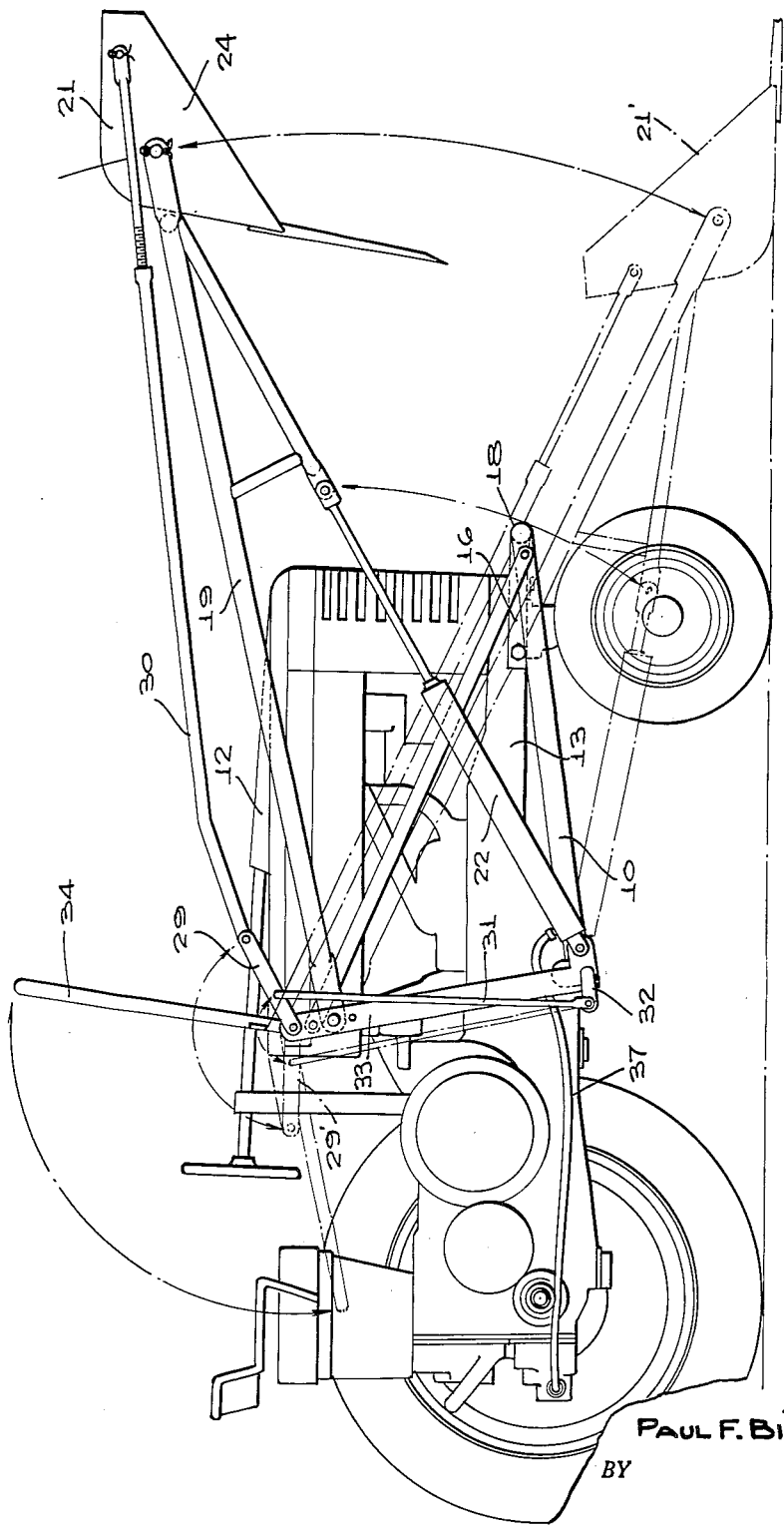

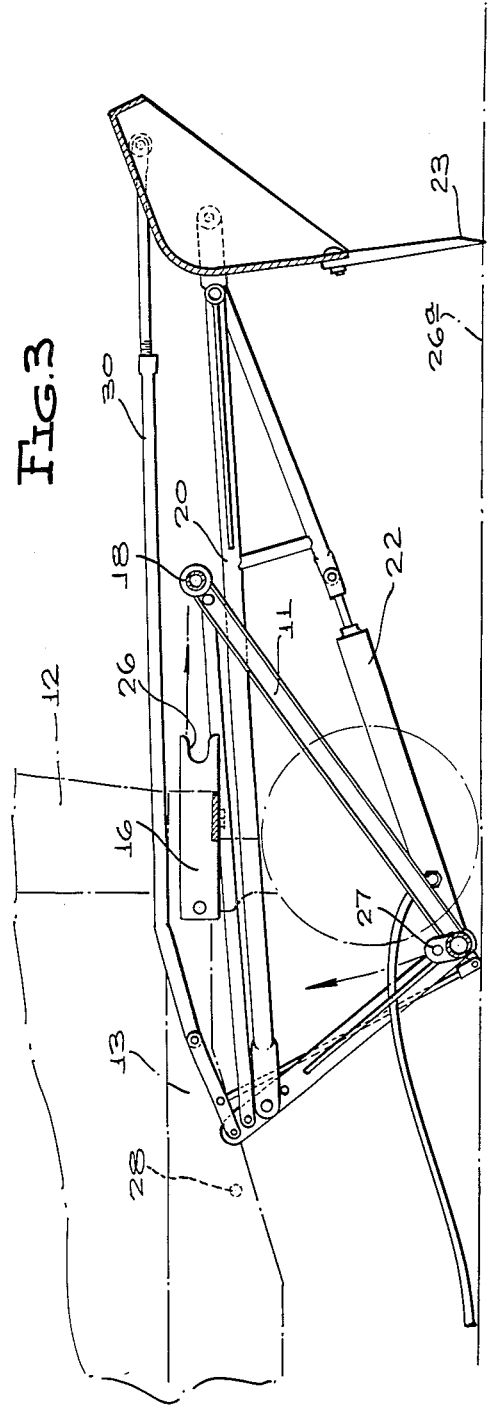

United States Patent Office 2,745,564
Patented May 15, 1956

2,745,564

SHOVEL LOADER ATTACHMENT FOR TRACTORS

Paul F. Billenstein, La Rue, Ohio

Application April 1, 1955, Serial No. 498,540

4 Claims. (Cl. 214—140)

The present invention relates to a shovel loader to be used as an accessory attachment on a tractor.

The primary object of the present invention is to provide a shovel loader for a tractor which is automatically raised to the attaching position upon abutment of the tractor front attaching member with a portion of the loader.

Another object of the present invention is to provide a shovel loader for a tractor requiring only the simple steps of inserting a pin in each side of the frame of the tractor to connect the loader to the tractor.

A further object of the present invention is to provide a shovel loader for a tractor having a simple and effective means for holding the shovel in the load-carrying position and a simple and effective means for causing the shovel to dump its load.

A still further object of the present invention is to provide a shovel loader attachment for a tractor which may be readily disconnected and reconnected to the tractor anywhere, and one which is simple in structure, sturdy of construction, and one economical to manufacture and assemble, as well as one which is highly effective in action.

These and other objects and advantages of the present invention will be fully apparent from the following description when taken in connection with the annexed drawings, in which:

Figure 1 is a side view in elevation of a tractor showing the present invention installed thereon and in full lines showing the shovel of the tractor in dumping position and in dotted lines showing the shovel in loading position.

Figure 2 is a top plan view of the shovel loading attachment of the present invention installed upon a tractor.

Figure 3 is a side view partially in cross section of a portion of the tractor with the shovel loader attachment in position to be attached to the tractor, and showing in dotted lines the position of the loader after it has been raised to the attaching position.

Figure 4 is a view in perspective of the means for attaching the loader to the front end of the tractor.

Figure 5 is a detail view of the latch and release means of the shovel.

Figure 6 is a detail view taken vertically of the latch and release means.

Figure 7 is another detail view of the latch and release means as seen on the opposite side from that of Figure 5.

Referring in greater detail to the drawings in which like numerals indicate like parts throughout the several views, the present invention consists of a shovel loader attachment for use with a tractor and comprises a pair of side frames 10 and 11 arranged longitudinally of a tractor 12, the latter having a frame including spaced side bars 13 and 14 and a cross bar 15 connecting the front ends of the side bars 13 and 14 together. An attaching bracket including a pair of longitudinally spaced side members 16 and 17, shown most clearly in Figure 4, is secured to the tractor frame side bars 13 and 14 longitudinally along the side bars, each with the end inwardly of the cross bar 15 bolted to the adjacent side bar. The bracket side members 16 and 17 extend by their other end portions beyond the cross bar 15 and forwardly of the tractor.

The shovel loader attachment is provided with a pivot bar 18 arranged parallel to and at substantially the same height from the ground as the tractor frame cross bar 15 and connects the forward parts of the lower ends of the side frames 10 and 11 together, the rear parts of the side frames 10 and 11 being connected together also and when positioned on the tractor 12, are connected by one bolt each to the adjacent one of the tractor frame side bars 13 and 14.

Each of the side frames is of a triangular shape with one leg extending upwardly forming a standard and has at its upper end portion a pivotal connection to the one end of one of the pair of longitudinally arranged booms 19 and 20, the other ends of the booms carrying the shovel 21.

The booms 19 and 20 each have a cylinder and piston assembly, indicated by the reference numeral 22 in Figures 1 and 3 for effecting the upward and downward movement of the shovel 21 and the booms for lifting and loading materials.

The shovel 21 is provided with a bottom and with teeth 23 projecting forwardly from the bottom and has spaced side walls 24 and 25 pivotally connected one to each of the booms 19 and 20 so that the shovel can tip from its loading or carrying position shown in dotted lines and indicated by the reference numeral 21' in Figure 1, to the dumping or unloading position shown in full lines in that figure.

As shown in Figure 3 the shovel 21 has been moved to the unloading position and is at the limit of its clockwise movement with the teeth 23 resting upon the ground.

In Figure 3 the tractor shown in dotted lines has been moved between the side frames 10 and 11 of the loader and the ends of the bracket side members, each having a bifurcated formation 26, in position to receive the end portions of the pivot bar 18. The tractor 12 is then to be moved forwardly as indicated by the arrow in Figure 3 until the pivot bar 18 is received in the ends of the side members 16 and 17, and then with further movement forwardly with the teeth of the shovel engaging the ground as a point of fulcrum or pivot point, the ground being indicated in Figure 3 by the reference numeral 26a, the side frames 10 and 11 will rise to an elevated position in which the hole 27 provided in the lower end of the side frames is in alignment with a hole 28 in each of the side bars of the tractor frame, permitting the installation of a securing bolt (not shown) therein to secure the side members in the elevated position on the tractor frame. The direction of this movement is shown by the arrow in Figure 3.

The upper ends of the standards formed by the upright legs of the side frames 10 and 11 are each provided with an over center link 29 connecting the standard to the one end of the adjacent trip bar 30 which has its other end pivotally connected to the respective one of the shovel side walls 24 or 25. Each of the links 29 is movable from the rearward position shown in dotted lines and indicated by the reference numeral 29' in Figure 1 to the full line position and causes the extension and retraction of its associated trip bar 30, the extension of each of the bars from the rearward position to the forward position causing the clockwise movement of the shovel from the carrying position to the dumping position shown in full lines in Figure 1.

A rod 31 on one side of the tractor has its upper end pivotally connected to the link 29 and has its lower end pivotally connected to the free end of an arm 32, the latter being connected to a shaft extending within the tube 32', Figure 2, there being another rod 31 on the other side of the tractor operatively connected to the other of the links 29 so that both links 29 are moved at one time by the handle 34.

Referring to Figures 5 to 7, inclusive, the upper end of one of the standards is indicated by the reference numeral 33 and the link 29 is shown in the rearward position, with the trip handle 34 having its abutment plate 35 underlying the adjacent portion of the link 29. A spring 36 balances the handle 34 in either forward or back positions and when the handle is swung upwardly and forwardly the link 29 is carried with it to move or extend the trip bar forwardly, dumping the shovel. The shovel is returned automatically to the carrying position by reason of its balanced position and the added weight of the trip bars 30.

In use, the piston and cylinder assembly 22 is supplied with hydraulic fluid from the tractor hydraulic system through hoses 37 and the shovel is used in the conventional manner swinging the teeth downwardly and forwardly under material to be lifted and loaded and then the shovel raised over the vehicle and the shovel dumped of its load. When it is desired to detach the loader attachment, the shovel is turned to the dumped position and the teeth are lowered into resting engagement with the ground surface, the bolts which hold the side frames to the side bars of the tractor are then removed and the tractor is backed out slowly, lowering the rear ends of the side frames to the ground. The loader attachment is then in position for reattachment to the tractor at any time as heretofore described.

An important feature of the invention is that the shovel when raised remains in a horizontal level position with the teeth 23 projecting in a horizontal plane at all heights. This permits unloading of a vehicle as well as loading, the teeth of the shovel being parallel to the floor of the vehicle.

What is claimed is:

1. The combination with a tractor frame including spaced side bars and a cross bar connecting the front ends of said side bars together, a pair of steerable wheels supporting said cross bar and adjacent portions of said frame side bars above a ground surface, and a pair of side members arranged in longitudinal spaced relation positioned longitudinally along the frame side bars and having the ends inwardly of said frame cross bar detachably connected to said frame side bars, the portions adjacent the other ends of said side members projecting beyond said frame cross bar, of a shovel loader attachment including a pivot bar arranged parallel to and on substantially the same level as said frame cross bar, a pair of upstanding side frames arranged longitudinally of said tractor frame side bars and having the forward parts of their lower ends fixed to said pivot bar and having the rear parts of their lower ends resting upon the ground surface, a pair of booms arranged longitudinally of said side frames and having adjacent ends connected to said side frames adjacent the upper ends thereof for upward and downward movement about a horizontal axis, and a shovel having a bottom provided with projecting teeth and spaced side walls rising from said bottom arranged adjacent the other ends of said booms so that the front edges of said side walls face downwardly with said shovel teeth engaging the ground surface, the side walls of said shovel being connected to the other ends of said booms for free movement in clockwise and counterclockwise directions about a horizontal axis, said pivot bar being receivable in and rotatably supported intermediate its ends in the other ends of said side members upon movement of said tractor frame an extent such as to bring the other ends of said side members into engagement with said pivot bar and said rear parts of the lower end of said side frames being movable to elevated positions alongside of said tractor side bars about the point of engagement of said shovel teeth with the ground surface as a pivot, and means detachably securing the rear parts of the lower ends of said side frames in the elevated position to said tractor side bars.

2. The combination with a tractor frame including spaced side bars and a cross bar connecting the front ends of said side bars together, a pair of steerable wheels supporting said cross bar and adjacent portions of said frame side bars above a ground surface, and a pair of side members arranged in longitudinal spaced relation positioned longitudinally along the frame side bars and having the ends inwardly of said frame cross bar detachably connected to said frame side bars, the portions adjacent the other ends of said side members projecting beyond said frame cross bar, of a shovel loader attachment including a pivot bar arranged parallel to and on substantially the same level as said frame cross bar, a pair of upstanding side frames arranged longitudinally of said tractor frame side bars and having the forward parts of their lower ends fixed to said pivot bar and having the rear parts of their lower ends resting upon the ground surface, a pair of booms arranged longitudinally of said side frames and having adjacent ends connected to said side frames adjacent the upper ends thereof for upward and downward movement about a horizontal axis, and a shovel having a bottom provided with projecting teeth and spaced side walls rising from said bottom arranged adjacent the other ends of said booms so that the front edges of said side walls face downwardly with said shovel teeth engaging the ground surface, the side walls of said shovel being connected to the other ends of said booms for free movement in clockwise and counterclockwise directions about a horizontal axis, said shovel at the limit of its counterclockwise movement being in a load carrying position and at the limit of its clockwise movement being in a load dumping position, means for effecting the movement of said shovel from the load carrying position to the load dumping position, said pivot bar being receivable in and rotatably supported intermediate its ends in the other ends of said side members upon movement of said tractor frame an extent such as to bring the other ends of said side members into engagement with said pivot bar and said rear parts of the lower end of said side frames being movable to elevated positions alongside of said tractor side bars about the point of engagement of said shovel teeth with the ground surface as a pivot, and means detachably securing the rear parts of the lower ends of said side frames in the elevated position to said tractor side bars.

3. The combination with a tractor frame including spaced side bars and a cross bar connecting the front ends of said side bars together, a pair of steerable wheels supporting said cross bar and adjacent portions of said frame side bars above a ground surface, and a pair of side members arranged in longitudinal spaced relation positioned longitudinally along the frame side bars and having the ends inwardly of said frame cross bar detachably connected to said frame side bars, the portions adjacent the other ends of said side members projecting beyond said frame cross bar, of a shovel loader attachment including a pivot bar arranged parallel to and on substantially the same level as said frame cross bar, a pair of upstanding side frames arranged longitudinally of said tractor frame side bars and having the forward parts of their lower ends fixed to said pivot bar and having the rear parts of their lower ends resting upon the ground surface, a pair of booms arranged longitudinally of said side frames and having adjacent ends connected to said side frames adjacent the upper ends thereof for upward and downward movement about a horizontal axis, and a shovel having a bottom provided with projecting teeth and spaced side walls rising from said bottom arranged adjacent the other ends of said booms so that the front edges of said side walls face downwardly with said shovel teeth engaging the ground surface, the side walls of said shovel being connected to the other ends of said booms for free movement in clockwise and counterclockwise directions about a horizontal axis, said shovel at the limit of its counterclockwise movement being in a load carrying position and at the limit of its clockwise movement being in a load dumping position, means for effecting the movement of said shovel from the load carrying position to the load dumping position, means releasably restraining movement of said shovel from either of said positions to the other, said pivot bar being receivable in and rotatably supported intermediate its ends in the other ends of said side members upon movement of said tractor frame an extent such as to bring the other ends of said side members into engagement with said pivot bar and said rear parts of the lower end of said side frames being movable to elevated positions alongside of said tractor side bars about the point of engagement of said shovel teeth with the ground surface as a pivot, and means detachably securing the rear parts of the lower ends of said side frames in the elevated position to said tractor side bars.

4. The combination with a tractor frame including spaced side bars and a cross bar connecting the front ends of said side bars together, a pair of steerable wheels supporting said cross bar and adjacent portions of said frame side bars above a ground surface, and a pair of side members arranged in longitudinal spaced relation positioned longitudinally along the frame side bars and having the ends inwardly of said frame cross bar detachably connected to said frame side bars, the portions adjacent the other ends of said side members projecting beyond said frame cross bar, of a shovel loader attachment including a pivot bar arranged parallel to and on substantially the same level as said frame cross bar, a pair of upstanding side frames arranged longitudinally of said tractor frame side bars and having the forward parts of their lower ends fixed to said pivot bar and having the rear parts of their lower ends resting upon the ground surface, a pair of booms arranged longitudinally of said side frames and having adjacent ends connected to said side frames adjacent the upper ends thereof for upward and downward movement about a horizontal axis, means operatively connected to said booms for effecting the movements thereof, and a shovel having a bottom provided with projecting teeth and spaced side walls rising from said bottom arranged adjacent the other ends of said booms so that the front edges of said side walls face downwardly with said shovel teeth engaging the ground surface, the side walls of said shovel being connected to the other ends of said booms for free movement in clockwise and counterclockwise directions about a horizontal axis, said shovel at the limit of its counterclockwise movement being in a load carrying position and at the limit of its clockwise movement being in a load dumping position, means for effecting the movement of said shovel from the load carrying position to the load dumping position, means releasably restraining movement of said shovel from either of said positions to the other, said shovel being movable from the unloading position to the load carrying position upon frictional engagement of said shovel teeth with the ground surface and rearward movement of said tractor frame to effect rotation of said shovel in the counterclockwise direction, said pivot bar being receivable in and rotatably supported intermediate its ends in the other ends of said side members upon movement of said tractor frame an extent such as to bring the other ends of said side members into engagement with said pivot bar and said rear parts of the lower end of said side frames being movable to elevated positions alongside of said tractor side bars about the point of engagement of said shovel teeth with the ground surface as a pivot, and means detachably securing the rear parts of the lower ends of said side frames in the elevated position to said tractor side bars.

No references cited.